(12) United States Patent
Herrscher et al.

(10) Patent No.: US 6,190,242 B1
(45) Date of Patent: Feb. 20, 2001

(54) UNIVERSAL GRINDING MACHINE

(75) Inventors: Albert Herrscher, Gladbach; Victor Kopp, Erftstadt, both of (DE)

(73) Assignee: Alfred H. Schutte GmbH & Co. KG (DE)

( * ) Notice: Under 35 U.S.C. 154(b), the term of this patent shall be extended for 0 days.

(21) Appl. No.: 09/405,880

(22) Filed: Sep. 24, 1999

(30) Foreign Application Priority Data

Sep. 26, 1998 (DE) ............................................... 198 44 243

(51) Int. Cl.[7] ...................................................... B24B 7/00
(52) U.S. Cl. .............................. 451/177; 451/48; 451/49; 451/221; 451/231; 451/246; 451/298
(58) Field of Search ............................. 451/48, 49, 221, 451/231, 246, 398

(56) References Cited

U.S. PATENT DOCUMENTS 4,930,265 * 6/1990 Belthle ..................................... 451/49
5,035,086 * 7/1991 Katsuki et al. ......................... 451/49
6,039,634 * 3/2000 Bach et al. ............................. 451/49

FOREIGN PATENT DOCUMENTS 35 23 013   2/1987 (DE) .

OTHER PUBLICATIONS

H. Geistmann and D. Scheder, *A Generation of Flexible CMC Grinding Machines*, magazine article, No. 72, vol. 86.
*Schaudt Options*, Brochure by Schaudt Maschinenbau GmbH.
German Search Report dated Mar. 23, 1999.

* cited by examiner

Primary Examiner—Joseph J. Hail, III
Assistant Examiner—Shantese McDonald
(74) Attorney, Agent, or Firm—Vickers, Daniels & Young

(57) ABSTRACT

A universal grinding machine having a plurality of workpiece holders, each of which can be moved independently of each other or jointly, by a separate slide, in the longitudinal direction of the workpiece on a slide guide disposed on the machine bed, or which can be fixed independently of each other or jointly to the machine bed.

9 Claims, 1 Drawing Sheet

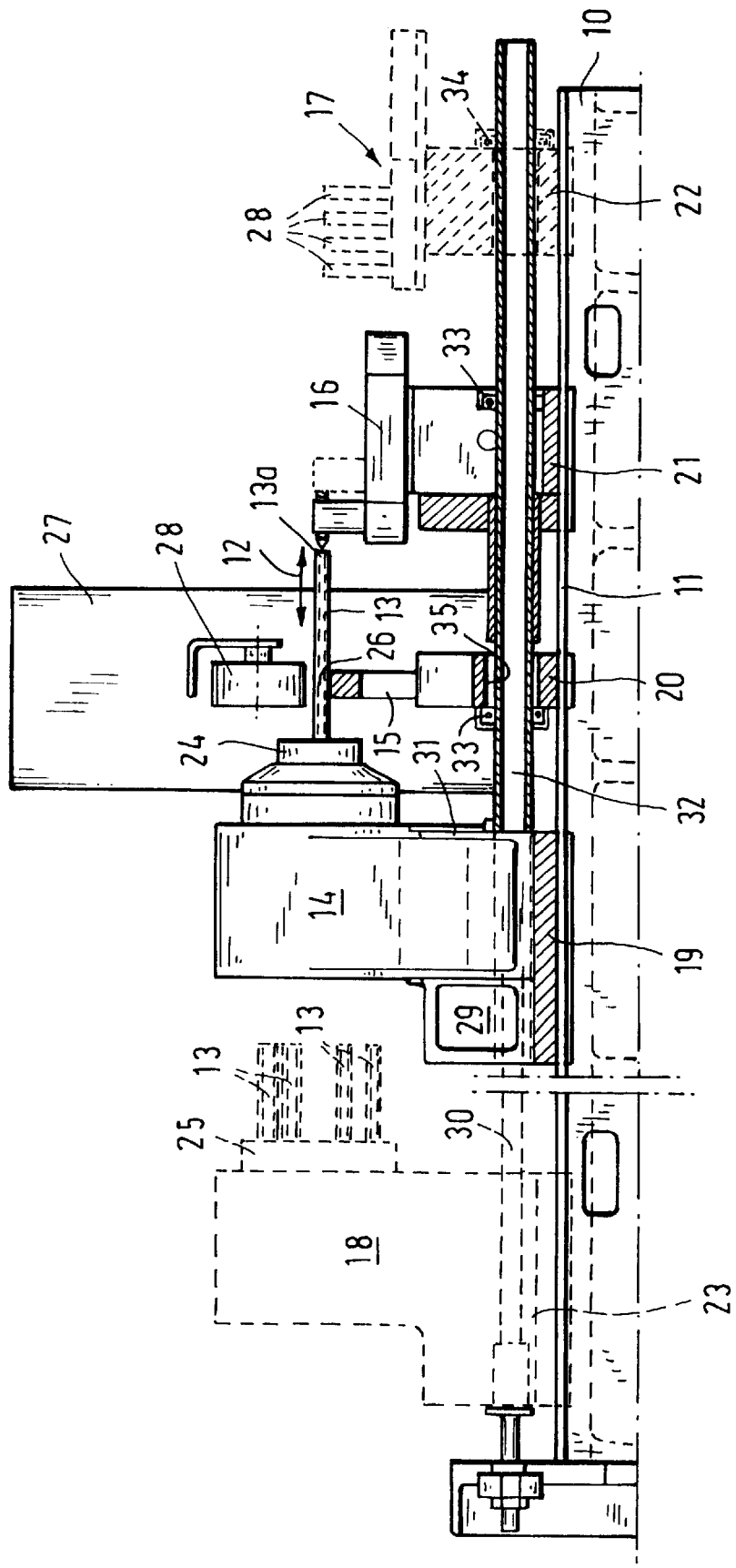

UNIVERSAL GRINDING MACHINE

FIELD OF INVENTION

This invention relates to a universal grinding machine, particularly for the machining of tools, having a machine bed, at least one workpiece holder, and a grinding station which is disposed beside the workpiece and in which a rotating grinding toot which can be advanced on to the workpiece is interchangeably disposed

BACKGROUND OF INVENTION

Universal grinding machines, which can be used not only for the circular grinding and surface grinding of metal workpieces, but which can also be used for the machining of tools, generally have a fixedly disposed grinding station, next to which the workpiece which is to be machined is disposed and is held by a workpiece holder. The workpiece holder here can be a spindle head, in the rotating workpiece spindle of which the workpiece is chucked. However, the holder may also be a simple holder in which the workpiece is chucked for surface grinding.

In known universal grinding machines, the workpiece holders, such as the spindle head, the tailstock and the fixed stay for circular grinding or the clamping jaws for surface grinding, are fixed to a work table which can be moved in sliding guides on the machine bed at the grinding station. It is thereby possible to bring the workpiece into the desired position in front of the grinding wheel, or to move it along the latter so that the grinding wheel can perform the desired machining operation over the entire length of the workpiece which is chucked in the workpiece holders.

In known machines, the work table, which can be moved over its entire length, takes up considerable space, and its sliding guide on the machine bed has a considerable overall height. Even when traverse-grinding relatively thin, light workpieces, the large mass of the entire work table has to be moved. Moreover, in order to chuck workpieces of different sizes it is necessary to detach the workpiece holder from the work table each time and to re-fix it in the correct position again, so that the nonproductive time is relatively long. This is particularly disadvantageous when it is only a small number of workpieces of the same shape which are to be machined on the machine each time.

SUMMARY OF INVENTION

The object of the present invention is to simplify a universal grinding machine and to construct it so that the workpiece holder can be adjusted very simply and rapidly to the size of the workpiece to be machined, and can be held fixed according to its purpose and independently of a work table, or can be set to or moved past the grinding location together with the workpiece.

This object is achieved by the invention by the provision of a plurality of workpiece holders, each of which has a separate slide by which it can be moved on the machine bed in the longitudinal direction of the workpiece and can be fixed to the machine bed.

This design has the advantage that a work table is not necessary, but instead the workpiece holders are disposed directly on the machine bed and can be moved there in a longitudinal direction in relation to each other. They can thereby be set, in a simple manner, to any size of workpiece which is to be machined in each case and can be fixed directly to the machine bed. Moreover, it is possible to move the workpiece holders along the grinding tool, with the workpiece chucked between them, directly on the machine bed in the longitudinal direction thereof, without having to move the large mass of a work table.

It is particularly advantageous if all the workpiece holders can be moved by their slides on a slide guide which is common to all the slides. This results in a particularly simple and inexpensive construction. It is also possible, however, to assign separate slide guides, which are parallel to each other and on which said workpiece holders can be moved, to all the workpiece holders or to individual workpiece holders. A design such as this is advantageous for large workpieces, if two holders of the same type have to be provided side by side.

To permit the simple, rapid interchange not only of workpieces of different sizes but also of the tools used for grinding, at least one tool magazine is provided according to the invention which is equipped, just like the workpiece holders, with a separate slide device and which can be moved on one of the slide guides for all the workpiece holders or for individual workpiece holders. Just like the workpiece holders, a tool magazine such as this, which is disposed on a separate slide device, can move into a position next to the grinding station in which one of the tools which are accommodated in the magazine is opposite the tool receiver. A tool which is no longer required can thereby be removed very rapidly from the tool spindle and can be put away in the tool magazine situated beside the grinding station, after which another tool can be taken out of the tool magazine, placed in front of the tool spindle and inserted therein.

To permit rapid interchange of workpieces also, at least one workpiece store can be provided which can be moved by a separate slide device on one of the slide guides for the workpiece holders. A workpiece store such as this can be disposed behind a workpiece spindle head, for example, and can feed rod-shaped workpieces to the latter from behind.

It is particularly advantageous if all the workpiece holders or individual workpiece holders and/or all the tool magazines or individual tool magazines are joined to each other by means of a coupling element and can be moved jointly on their slide guides. This design has the advantage that a connection between a plurality of workpiece holders is made not only by the workpiece which is chucked between them but is also made directly by the coupling element. When changing workpieces, it is therefore not necessary to reset the workpiece holders in relation to each other since they retain their relative positions.

However, there can also be some workpiece holders which are not connected to the coupling element. It is possible, for example, fixedly to attach a fixed stay or steady to the machine bed to support the workpiece at the grinding location, and to guide the workpiece holders which are connected to each other by the coupling element, together with the workpiece, past the grinding disc and past the fixed steady.

A particularly simple and advantageous mode of construction is achieved if one workpiece holder has a connecting rod which extends in the direction of the slide guides and which can be coupled alternately to the other workpiece holders and optionally to the tool magazine and workpiece store by detachable clamping devices. The connecting rod here can be rigidly fixed to that workpiece holder which is constructed as a workpiece spindle head and which comprises a numerically controlled linear drive mechanism for its longitudinal movement along the slide guide.

As has already been mentioned, one of the workpiece holders can be constructed as a fixed stay for supporting the workpiece at the grinding location, whilst another workpiece holder can be constructed as a tailstock. The tailstock here can have a separate, numerically controlled linear drive mechanism, so that it can be moved in the longitudinal direction on its slide guide independently of the workpiece spindle head and can be adjusted to receive a workpiece which is driven in rotation.

Other features and advantages follow from the description given below with reference to the drawing, in which a more detailed explanation is given of an example of a preferred embodiment of the invention.

BRIEF DESCRIPTION OF THE DRAWING

The drawing is a schematic illustration of a universal grinding machine according to the invention, shown partly as a side view and partly as a longitudinal section.

DETAILED DESCRIPTION OF THE INVENTION

A slide guide 11, which extends in the longitudinal direction 12 of a workpiece 13 which is to be machined, is disposed on a machine bed 10, which is merely indicated by dashed lines in the drawing.

A plurality of workpiece holders 14,15 and 16, a tool magazine 17, and a workpiece store 18 are disposed above the slide guide 11. Each workpiece holder 14,15 and 16 has a separate slide 19; 20; 21, by means of which it can travel along the slide guide 11. In the embodiment shown, the slide guide is common to the slides 19, 20 and 21 of all the workpiece holders 14, 15 and 16, namely the workpiece holders 14,15 and 16 can be moved by their slides 19, 20 and 21 in the longitudinal direction 12 of the workpiece 13 on the same slide guide 11.

Just like the workpiece holders, the tool magazine 17 and the workpiece store 18 have a separate slide device 22 or 23, by means of which they can likewise be displaced in a longitudinal direction 12 on the slide guide 11.

In the embodiment illustrated, the workpiece holder 14 is a workpiece spindle head which comprises a workpiece spindle which is driven in rotation and to which the workpieces are fed from behind from the workpiece store 18. The workpieces 13 are disposed in a rotatable drum 25 of the workpiece store 18.

The workpiece holder 16 is constructed as a tailstock and supports the workpiece 13, which is chucked in the workpiece spindle 24 of the workpiece spindle head 14, at the free end 13 a of the workpiece 13. The workpiece holder 15 between the spindle head 14 and the tailstock 16 is a fixed stay or steady, which supports the workpiece 13 at the grinding location 26 thereof.

The grinding station 27 with the machining tool 28, namely a grinding wheel which is disposed in a tool spindle here in a manner which is not illustrated and which can be advanced towards the workpiece in various grinding positions, is situated laterally next to the chucked workpiece 13, and in the illustration is in the area behind the plane of the drawing.

Each of the slides 19 to 23 can be locked at any desired position of the slide guide 11 on the machine bed 10 by means of fixing devices which are not illustrated here. The workpiece holder 14, which is constructed as a workpiece spindle head, has a numerically controlled linear drive mechanism 29 by means of which it can be moved in the longitudinal direction 12 on the slide guide 11. The linear drive mechanism 29 can be a hydraulic drive mechanism, a rack drive mechanism or an electric linear motor. In the present case, the linear drive mechanism 29 for the workpiece holder 14 is a spindle drive mechanism, the spindle 30 of which passes through the housing of the workpiece holder 14 and through the housing of the workpiece store 18.

A coupling element 32 in the form of a tubular connecting rod, which the spindle 30 of the linear drive mechanism 29 can enter and which extends above the slide guide 11 in the longitudinal direction 12 thereof, is fixed to the workpiece spindle head 14 on the front side 31 thereof which faces the tailstock 16.

The coupling element 32 passes through the workpiece holders 15 and 16 and through the tool magazine 17 in a manner such that it does not impede the to and fro movements thereof on the slide guide 11. The workpiece holders 15 and 16 have clamping devices 33, and the tool magazine 17 also has a clamping device 34 with which this assemblies can be coupled to the coupling element 32 and can then be moved, jointly with the workpiece spindle head 14 and at the desired spacing therefrom, along the slide guide 11.

In the embodiment illustrated, the tailstock 10 also has a separate, numerically controlled linear drive mechanism, by means of which it can be moved along the slide guide and optionally along the connecting rod 32 in the longitudinal direction 12.

In the same manner, the tool magazine 17 and the tool store 18 can also of course be provided with separate linear drive mechanisms.

It can be seen that all the workpiece holders 14, 15 and 16, the tool magazine 17, and the workpiece store 18 can be moved individually and independently of each other on the slide guide 11 in the longitudinal direction 12, and that it is also possible for some or all of them to be coupled to the coupling element 32 by the clamping devices 33 and 34 and for them to be moved jointly in the longitudinal direction 12. It is thereby possible to bring each unit individually into the desired position and either to attach it to the machine bed 10 there and thereby to fix it, or to fasten it to the coupling element 32 by means of the clamping devices 33 or 34 and then to move it in the longitudinal direction 12 and to carry out a longitudinal grinding operation.

Thus it is possible, for example, to chuck an elongated workpiece 13 between the workpiece spindle 24 of the head stock 14 and the centring point of the tailstock 16 by displacing the tailstock 16 in relation to the workpiece spindle head 18, followed by fixing the tailstock 16 by means of its clamping device 33 to the coupling element 32, and then to move both these parts, together with the workpiece 13 which is driven in rotation, in the direction of arrow 12 on the rotating grinding wheel 28, wherein the fixed stay 15, which was previously brought into position under the grinding location 26 and was fixed to the machine bed 10, retains its position and always supports the workpiece 13 which is moved along the grinding wheel 28.

In the course of this procedure, the connecting rod 32 can slide through the aperture 35 in the fixed stay 15 which is provided for this purpose.

The invention is not restricted to the form of construction which is illustrated and which has been described. In contrast, numerous modifications and additions are possible without departing from the scope of the invention. In particular, it may be advantageous for the fixed stay 15 and the tool magazine 17 to be moved only on the special slide guides which are associated with them and which are disposed laterally next to the slide guide 11 for the workpiece holder and parallel thereto. It is then possible to bring the tool magazine 17 in front of the grinding station 27 and to replace the machining tool 28 by a new one without the workpiece holder with the tool having to be moved out of the grinding station. It may also be advantageous to locate the workpiece store 18 in a second vertical plane beside the workpiece spindle head and to cause it to travel on a separate slide guide in order to limit the longitudinal extent of the machine.

Instead of separate magazines for tools and workpieces, a universal magazine can also be provided which can receive tools and/or workpieces and which can be moved, on a separate slide guide by means of a separate slide device, laterally next to the workpiece holders and parallel thereto. This universal magazine or a tool carrier which can move laterally next to the workpiece holders can also be coupled to at least one of the workpiece holders.

What is claimed is:

1. A universal grinding machine for machining a workpiece held at a grinding location, the grinding machine comprising:

a machine bed, a grinding station disposed beside the grinding location, a rotary grinding tool interchangeably disposed in the grinding station, said grinding tool being capable of being advanced on a workpiece held at the grinding location, a plurality of workpiece holders, each workpiece holder displaceable on its own slide by which it is fixable to said machine bed and which enables independent or joint movement on said machine bed in the longitudinal direction of a workpiece held in a workpiece holder, comprising one or more slide guides on which slides of workpiece holders are movable, and a tool magazine is provided which is equipped with a separate slide device and can be moved on one of the slide guides for the workpiece holders.

2. A machine according to claim 1, wherein at least one workpiece store is provided which can be moved by a separate slide device on one of the slide guides for the workpiece holders.

3. A machine according to claim 1, wherein a universal magazine is provided, which can receive tools and workpieces and which can be moved laterally next to the workpiece holders and parallel thereto, by a separate slide device on a separate slide guide.

4. A machine according to claim 1, wherein a tool holder or a universal magazine, which can be moved laterally next to the workpiece holders, can be coupled to at least one of the workpiece holders.

5. A machine according to claim 1, wherein all the workpiece holders or individual workpiece holders are joined to each other by means of a coupling element and can be moved jointly on their slide guides.

6. A machine according to claim 1, wherein all the tool magazines or individual tool magazines are joined to each other by means of a coupling element and can be moved jointly on their slide guides.

7. A machine according to claim 1, wherein one workpiece holder has a connecting rod which extends in the direction of the slide guides and can be coupled alternately to the other workpiece holders and optionally to the workpiece store by detachable clamping devices.

8. A machine according to claim 7, wherein the connecting rod is rigidly fixed to that workpiece holder which is constructed as a workpiece spindle head and which comprises a numerically controlled linear drive mechanism for its movement along the slide guide.

9. A machine according to claim 1, wherein one of the workpiece holders is constructed as a fixed stay for supporting the workpiece at the grinding location.

* * * * *